United States Patent [19]

Inoue

[11] Patent Number: 4,469,350
[45] Date of Patent: Sep. 4, 1984

[54] FRONT SUSPENSION FOR FRONT WHEEL DRIVE VEHICLE

[75] Inventor: Hitoshi Inoue, Hiroshima, Japan

[73] Assignee: Toyo Kogyo Co., Ltd., Hiroshima, Japan

[21] Appl. No.: 454,157

[22] Filed: Dec. 29, 1982

[30] Foreign Application Priority Data

Jan. 7, 1982 [JP] Japan ................................. 57-1134

[51] Int. Cl.³ .............................................. B62D 9/00
[52] U.S. Cl. .................................... 280/675; 280/691
[58] Field of Search ............... 280/660, 673, 675, 691

[56] References Cited

U.S. PATENT DOCUMENTS 2,092,612  9/1937  Olley .................................... 280/675

FOREIGN PATENT DOCUMENTS

| 583840 | 10/1958 | Italy ........................... 280/675 |
| 20039 | 5/1974 | Japan . |
| 22225 | 2/1977 | Japan . |
| 138235 | 10/1979 | Japan . |
| 1024291 | 3/1966 | United Kingdom ............ 280/675 |

Primary Examiner—Joseph F. Peters, Jr.
Assistant Examiner—Kenneth R. Rice
Attorney, Agent, or Firm—Gerald J. Ferguson, Jr.; Joseph J. Baker

[57] ABSTRACT

In a front suspension for a front engine front wheel drive vehicle having the engine laterally mounted and the center of gravity laterally offset from the longitudinal axis thereof, the roll center of the suspension is offset from the central longitudinal axis toward the side of the center of gravity.

13 Claims, 13 Drawing Figures

FRONT SUSPENSION FOR FRONT WHEEL DRIVE VEHICLE

BACKGROUND OF THE INVENTION

1. Field of the Invention

This invention relates to a front suspension for a front engine front wheel drive type (FF type) vehicle, and more particularly to an improvement in a front suspension for an FF type vehicle in which the center of gravity of the body is offset from the center due to the laterally mounted engine.

2. Description of the Prior Art

In most the FF type vehicles, the engine is laterally mounted so that its output shaft extends transverse to the longitudinal axis of the body of the vehicle in order to facilitate mounting of a clutch mechanism, a differential gear, a transmission and so forth together with the engine in a limited space of the engine room. When the engine is laterally oriented, the engine is generally disposed in an off-center position toward right or left with respect to the central longitudinal axis of the body to make sufficient room for mounting those components. Since the engine is very heavy compared with the other components such as the transmission and the differential gear, the center of gravity of the body is shifted toward the side of the engine if the engine is off-center with respect to the longitudinal axis of the body.

In a vehicle whose center of gravity is not on the longitudinal axis of its body, there has been recognized a problem that the right steering effect differs from the left steering effect, which adversely affects the driving stability. That is, when turning to the side opposite to the center of gravity with a certain turning radius, the steering wheel must be rotated by a larger angle than the angle required for turning to the side of the center of gravity with the same turning radius.

Now, the reason why the difference in steering effect arises as mentioned above will be briefly described referring to FIG. 1. As is well known, there is the relation represented by the curve in FIG. 1 between the cornering power and the vertical loads placed on the wheels. When there exists the difference $2\Delta Fz$ between the loads W1 and W2 on the inner wheel and the outer wheel, the cornering power of the vehicle is equal to the average value of the cornering powers C1 and C2 of the respective wheels. As can be seen from FIG. 1, the effective cornering power of the vehicle that is the average $(C1+C2)/2$ of the cornering powers C1 and C2 of the inner and outer wheels is smaller than the cornering power C0 of the vehicle which would be obtained when the loads W1 and W2 on the inner and outer wheels are equal to each other and equal to the average W thereof. The difference betwen the effective cornering power $(C1+C2)/2$ and the cornering power C0, i.e., the reduction of the cornering power, becomes more significant as the difference $2\Delta Fz$ between the loads W1 and W2 placed on the inner and outer wheels increases.

In a vehicle whose center of gravity is not on the longitudinal axis of the body, there exists a difference between the loads on the right and left wheels even when the vehicle runs straight. However, when the vehicle turns to the side opposite to the side of the center of gravity, the load placed on the outer wheel, i.e. the wheel on the side of the center of gravity, is increased and the load placed on the inner wheel (which has borne a smaller load than on the other wheel from the first, i.e. from the static state of the vehicle) is reduced due to the centrifugal force, whereby the difference $2\Delta Fz$ between the loads W1 and W2 on the inner and outer wheels is enlarged to increase the reduction of the cornering power. On the other hand, when the vehicle turns to the side of the center of gravity, a part of the express load on the inner wheel over that on the outer wheel in the static state of the vehicle is moved to the outer wheel due to the centrifugal force and accordingly the difference $2\Delta Fz$ between the loads W1 and W2 on the inner and outer wheels is reduced to lower the reduction of the cornering power. Therefore, in a vehicle whose center of gravity is not on the longitudinal axis of the body, the steering angle $\beta$ by which the steering wheel is required to be rotated when turning to the side opposite to the side of the center of gravity with a certain radius is larger than the same when turning to the side of the center of gravity, and vice versa.

Further, in FF type vehicles in which the engine is laterally mounted, the transmission and the differential gear are generally disposed on the side of the engine, namely these components and the engine are arranged laterally with these components located on the longitudinal axis side of the engine. Therefore, the one of the driving shafts which extends from the differential gear to the wheel on the side of the engine must be inherently longer than the other driving shaft. When the vehicle is running, a moment inwardly turning each front wheel about the driving shaft is generated due to the driving torque. The moment exerted on the one of the front wheels connected to the shorter driving shaft which forms a cathedral angle larger than that formed by the longer driving shaft is larger than the moment exerted on the other front wheel connected to the longer driving shaft. Accordingly, the steering wheel is apt to be biased toward the wheel connected to the longer driving shaft.

In the FF type vehicle, the above two actions combine to make the steering effect to the side of the center of the gravity of the body larger than the steering effect to the opposite side.

In Japanese Unexamined Patent Publication No. 52 (1977)-22225, there is disclosed a front suspension for removing the biasing effect on the steering due to the difference of the cathedral angle by setting the degree of center-offset of the wheel connected to the longer driving shaft larger than that of the wheel connected to the shorter driving shaft. Further, in Japanese Unexamined Patent Publication No. 54(1979)-138235 and Japanese Utility Model Publication No. 49(1974)-20039, there is disclosed a front suspension in which the differential gear is inclined so that the difference in the cathedral angle between the longer driving shaft and the shorter driving shaft is minimized. However, the suspensions disclosed in the above publications cannot compensate for the difference in the steering effect or the difference between the cornering powers in turning to the right and left due to the difference between the loads on the right and left front wheels, though they are effective in preventing the biasing effect on the steering due to the difference in the cathedral angle.

SUMMARY OF THE INVENTION

In view of the foregoing observations and description, the primary object of the present invention is to provide a front suspension for an FF type vehicle which can compensate for the difference between the cornering power in turning to the right and the cornering power in turning to the left, thereby nullifying the difference between the right steering effect and the left steering effect to improve the driving stability.

The front suspension in accordance with the present invention is characterized in that its roll center is offset from the longitudinal axis of the body of the vehicle toward the center of gravity of the body.

The roll center is defined as a center or an axis about which the body of the vehicle rolls. The roll center is determined differently depending upon the type of the suspension such as strut type, swing axle type, trailing arm type, semitrailing arm type, wishbone type and so forth as described in detail hereinafter.

By offsetting the roll center from the longitudinal axis toward the center of gravity, the difference between the cornering powers in turning to the right and left is compensated and the difference between the right steering effect and the left steering effect is nullified and the driving stability is improved.

In the strut type suspension, the roll center can be offset from the longitudinal axis of the body toward the center of gravity by making one of the lower arms connected to the wheel on the side of the center of gravity shorter than the other lower arm, making the inclining angle of the former lower arm with respect to the horizon larger than that of the latter lower arm, or making the inclining angle with respect to the horizon of one of the struts connected to the wheel on the side of the center of gravity smaller than that of the other strut.

In the wishbone type suspension, the same can be accomplished by making one of the lower arms connected to the wheel on the side of the center of gravity shorter than the other lower arm without changing the mounting height, making the inclining angle of the former lower arm with respect to the horizon larger than that of the latter lower arm, or making the inclining angle with respect to the horizon of the line connecting the point at which the upper arm on the side of the center of gravity is connected to the body with the point at which the lower arm on the same side is connected to the wheel samller than that of the corresponding line on the opposite side.

In the trailing arm type suspension, the same can be accomplished by changing the angle of the pivot of the trailing arm.

Similarly, the roll center can be offset from the longitudinal axis of the body by changing a part of the structure of the suspension.

DESCRIPTION OF THE PREFERRED EMBODIMENTS

Figure 2:
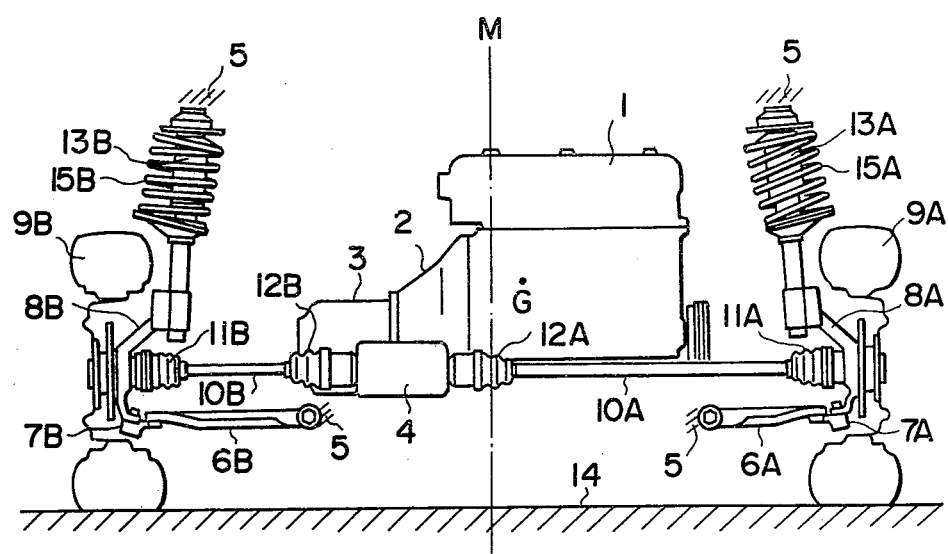
FIG. 2 is a front elevational view showing an embodiment of the present invention.

FIG. 2 shows a strut type front suspension, as viewed from behind, for an FF type vehicle in accordance with an embodiment of the present invention in the state when the vehicle is running straight or stands still. An engine 1 is mounted offset rightward from the longitudinal axis of the body 5 of the vehicle (represented by the vertical center line M in this figure) and is positioned laterally so that its output shaft extends leftward transversely to the longitudinal axis. A clutch 2, a transmission 3 and a differential gear 4 are disposed on the left side of the axis. On a right lower arm 6A pivotally connected to the body 5 is rotatably supported a right front wheel 9A by way of a joint 7A and a knuckle 8A. The right front wheel 9A is connected to the output shaft of the differential gear 4 by way of a right drive shaft 10A which is connected to the right front wheel 9A and the output shaft of the differential gear 4 by means of joints 11A and 12A, respectively. The joints 11A and 12A permit vertical movements of the right drive shaft 10A with respect to the wheel 9A and the differential gear 4. A shock absorber 13A is mounted between the body 5 and the knuckle 8A. A coil spring 15A is provided around the shock absorber 13A to urge the right front wheel 9A toward the road 14.

A left front wheel 9B is similarly supported by a left lower arm 6B, a joint 7B, a knuckle 8B, a shock abosrber 13B and a coil spring 15B, and is connected to the differential gear 4 by way of a left drive shaft 10B and joints 11B and 12B.

Since the engine is mounted in the manner described above, the right drive shaft 10A is longer than the left drive shaft 10B and the center of gravity G of vehicle is offset rightward from the axis. In this embodiment, the right lower arm 6A is made shorter than the left lower arm 6B in order to offset the roll center toward the center of gravity G. The height of the mounting point of the right lower arm 6A and the height of the joint 7A connecting the right lower arm 6A and the knuckle 8A are equal to those of the left side.

In this embodiment, the roll center of the body 5 is offset from the longitudinal axis or the vertical center line M of the body 5 toward the center of gravity G by making the lower arm on the side of the center of gravity G, i.e., the right lower arm 6A, shorter than the left lower arm 6B in order to nullify the difference between the right steering effect and the left steering effect due to the difference between the loads on the right and left front wheels.

Now the reason why the difference between the right steering effect and the left steering effect can be nullified with this arrangement will be described in detail referring to FIGS. 3A to 3C and 4.

Figure 3A:
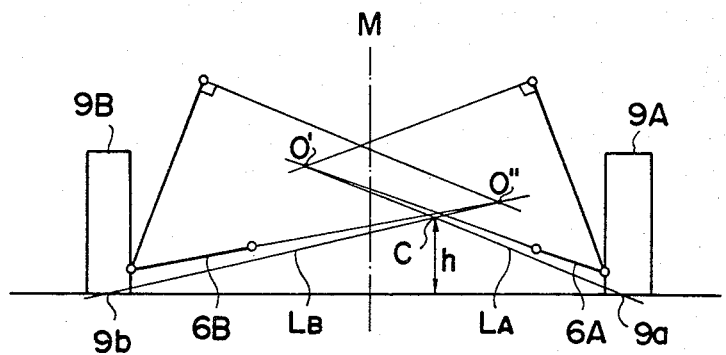
FIGS. 3A to 3C are schematic views illustrating the change of the position of the roll center in the embodiment of FIG. 2.
Figure 3B:
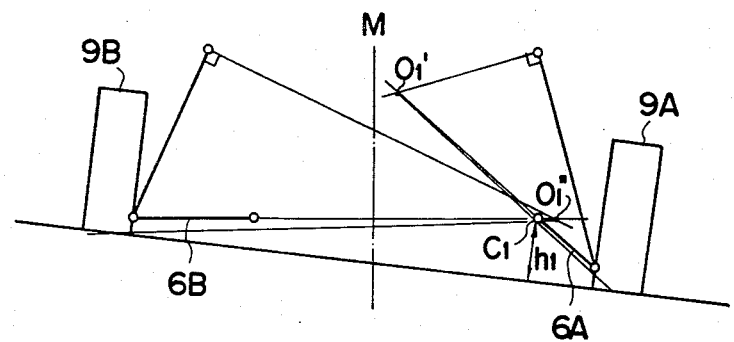
Figure 3C:
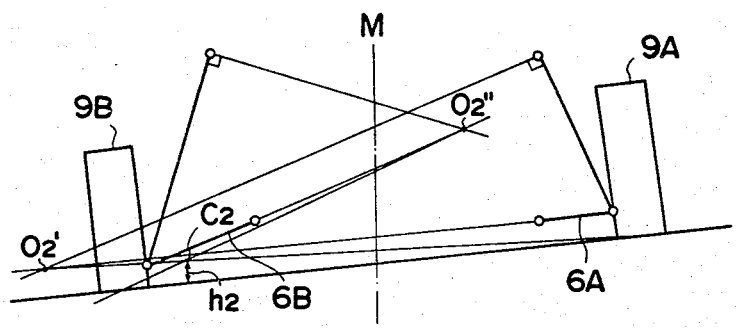

FIGS. 3A to 3C are schematic views of the front suspension of FIG. 2 as viewed from behind when the vehicle is running straight, turning to the right and turning to the left, respectively. The roll center C is offset from the center line M toward the right front wheel 9A supported on the shorter lower arm as indicated in FIG. 3A and is at a height of h when the vehicle is running straight. When the vehicle turns to the right or left, the roll center C is shifted toward the right or left as indicated at $C_1$ and $C_2$ in FIGS. 3B and 3C, respectively, and the height of the roll center is lowered as indicated at $h_1$ and $h_2$ in FIGS. 3B and 3C, respectively. Since the right lower arm 6A is shorter than the left lower arm 6B, the height $h_1$ of the roll center $C_1$ when turning to the right is higher than the height $h_2$ of the roll center $C_2$ when turning to the left if the turning radii are the same.

In the strut type suspension, the roll center C is at the intersection of a line LA passing through the treading point 9a of the right wheel 9A and an imaginary swing center O' of the right suspension, and a line LB passing through the treading point 9b of the left wheel 9B and an imaginary swing center O'' of the left suspension.

Figure 1:
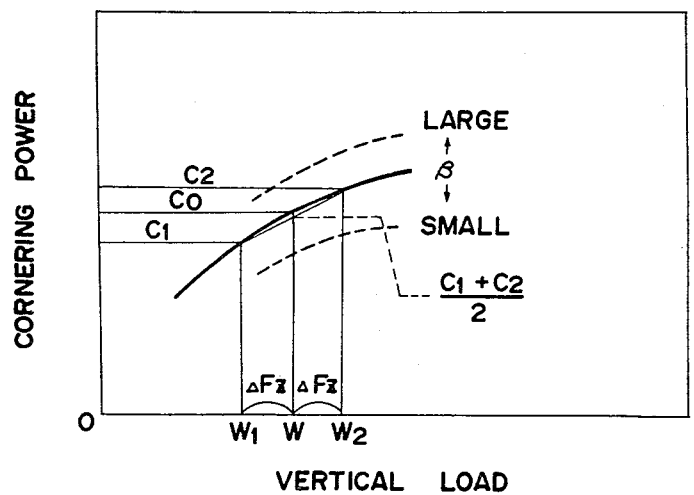
FIG. 1 is a graph showing the relationship between the loads on the inner and outer wheels and the cornering power.
Figure 4:
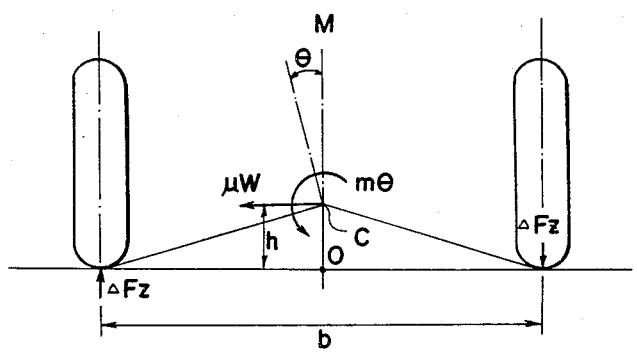
FIG. 4 is a schematic view for illustrating the balance of moments in a front suspension.

Hereinbelow, the balance of moments in the front suspension e.g. moments about point O at which the line connecting the treading points of the right and left wheels intersects the vertical cenger line M, will be discussed referring to FIG. 4. Assuming that the centrifugal force at a centripetal acceleration coefficient of $\mu$ is $\mu W$, the rigidity in rolling of the suspension is m, the rolling angle of the body is $\theta$, the tread between the front wheels is b and the difference between the loads on the front wheels is $\Delta Fz$, the following equation holds:

$$\mu W \cdot h + m\theta = b \cdot \Delta Fz$$

$$\therefore \Delta Fz = \frac{\mu W \cdot h + m\theta}{b}$$

Figure 5:
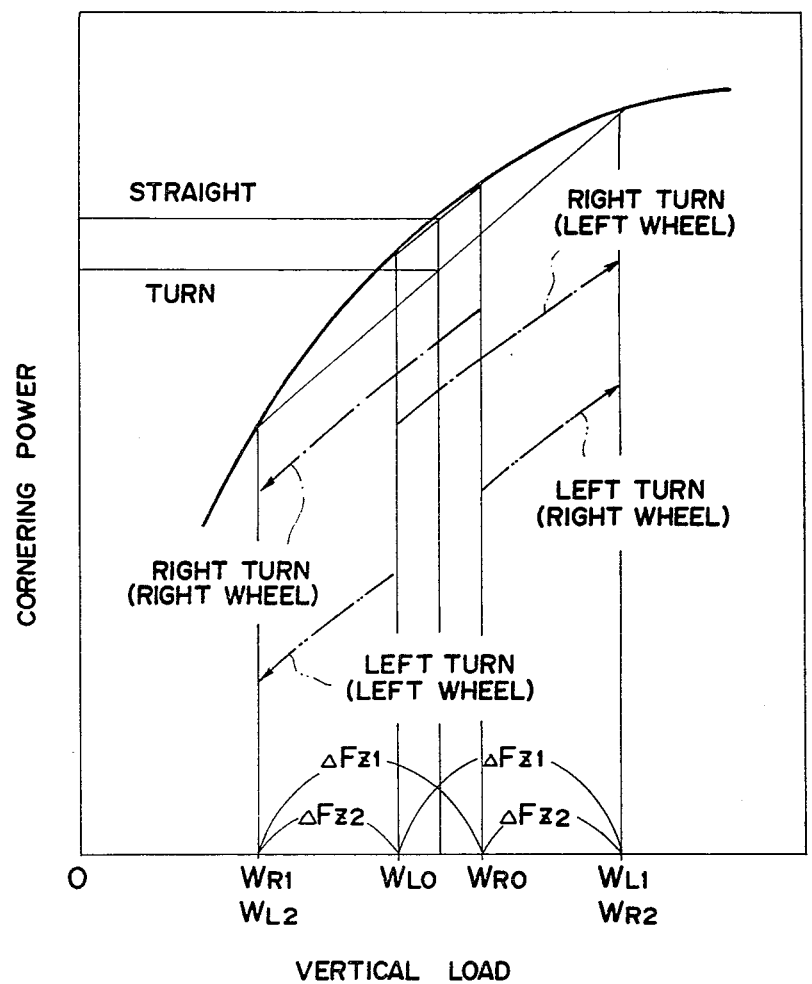
FIG. 5 is a graph similar to FIG. 1 showing the result of the present invention.

Accordingly, the difference between the vertical loads placed on the front wheels during rolling becomes larger as the height h of the roll center becomes higher. Since the height of the roll center is higher when turning to the right than when turning to the left as described above, the difference between the vertical loads placed on the front wheels during turning is larger when turning to the right than when turning to the left. This effect will be described in more detail referring to FIG. 5.

In this embodiment, the center of gravity of the body is offset from the center of the body toward the right. Now, the shift of the loads on the front wheels during turning to the right is considered assuming that the loads placed on the right and left front wheels are $W_{Ro}$ and $W_{Lo}$, respectively, when the vehicle is running straight, with $W_{Ro}$ being larger than $W_{Lo}$ ($W_{Ro} > W_{Lo}$). When the amount of the load shift due to rolling during turning to the right is assumed to be $\Delta Fz1$, the vertical loads placed on the left and right front wheels become $W_{L1}$ ($W_{L1} = W_{Lo} + \Delta Fz1$) and $W_{R1}$ ($W_{R1} = W_{Ro} - \Delta Fz1$), respectively. Similarly, when the amount of load shift due to rolling during turning to the left is assumed to be $\Delta Fz2$, the vertical loads placed on the left and right front wheels become $W_{L2}$ ($W_{L2} = W_{Lo} - \Delta Fz2$) and $W_{R2}$ ($W_{R2} = W_{Ro} + \Delta Fz2$), respectively. In this embodiment, the right lower arm is made shorter than the left lower arm so that the load shift during turning to the right becomes larger than that during turning to the left, i.e., $\Delta Fz1 > \Delta Fz2$. Accordingly, by setting the difference between the load shift during turning to the right and the load shift during turning to the left, i.e., ($\Delta Fz1 - \Delta Fz2$) equal to the difference between the loads placed on the right and left front wheels when the vehicle is running straight, i.e., ($W_{Ro} - W_{Lo}$), the difference between the loads placed on the right and left front wheels during turning to the right, i.e., ($|W_{L1} - W_{R1}|$), can be equalized to that during turning to the left, i.e., ($|W_{L2} - W_{R2}|$).

Thus it is possible to nullify the effect of the offset center of gravity of the body and equalize the difference between the loads placed on the front wheels when turning to the right with a certain turning radius with that when turning to the left with the same turning radius, whereby the cornering powers toward the right and left can be equalized or substantially equalized with each other.

In the above embodiment, the roll center is shifted toward the center of gravity by making the lower arm on the side of the center of gravity shorter than the lower arm on the opposite side.

However, it should be noted that there are various different methods for laterally shifting the center roll. Two other methods will be explained hereinbelow with reference to FIGS. 6 and 7.

Figure 6:
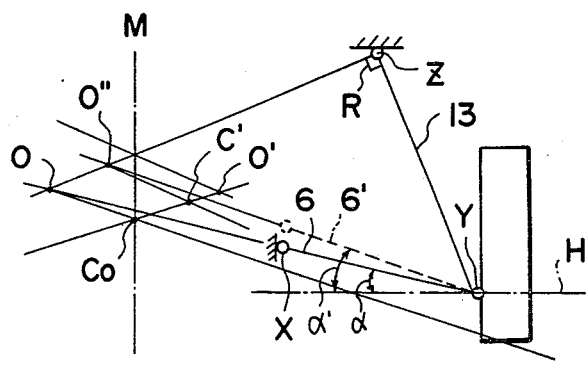
FIG. 6 is a schematic view for illustrating another embodiment of the present invention applied to a strut type suspension.

As shown in FIG. 6, in the strut type suspension, the roll center $C_0$ can be shifted from the longitudinal axis (represented by the center line M) of the body toward a desired side (to the right in FIG. 6) as indicated at C' by making the inclining angle $\alpha'$, with respect to the horizon H, of one of the lower arms 6' on the desired side larger than that $\alpha$ of the other lower arm 6. In other words, by enlarging the angle $\alpha$ on the desired side to $\alpha'$, the swing center is shifted from O to O'', and accordingly the roll center is shifted from $C_0$ to C'. The swing center O (O'') is an intersection of a line passing through the both ends X, Y of the lower arm 6(6') and a line passing through the upper holding point Z of the strut 13 at a right angle R with respect therewith. In FIG. 6, O' is the swing center of the suspension on the opposite side.

Figure 7:
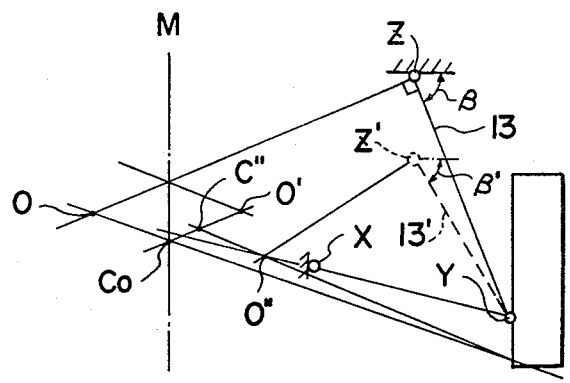
FIG. 7 is a schematic view for illustrating still another embodiment of the present invention also applied to a strut type suspension.

Further as shown in FIG. 7, the roll center $C_0$ which is originally on the center line M can be shifted toward a desired side as indicated at C'' by making the inclining angle $\beta'$ of the strut 13' on the desired side smaller than the inclining angle $\beta$ of the strut 13 on the opposite side.

Figure 8:
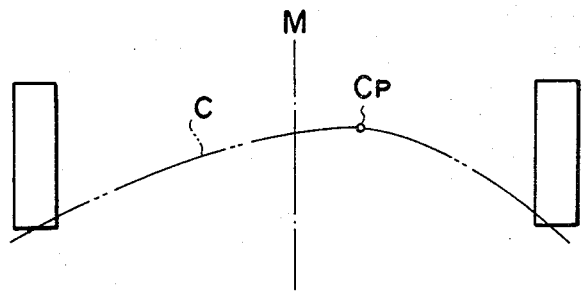
FIG. 8 is a graph showing the movement of the roll center in the embodiments of FIGS. 6 and 7.

In either of the cases described referring to FIGS. 6 and 7, the roll center C moves along the curve shown in FIG. 8 which has a peak Cp on the side of the center of gravity, and accordingly substantially the same effect as the effect obtained by shortening the lower arm on the side of the center of gravity can be obtained.

The above disclosure has all been made with reference to the invention embodied in a strut type suspension. However, it should be noted that the present invention can also be embodied in various other types of suspension.

Figure 9:
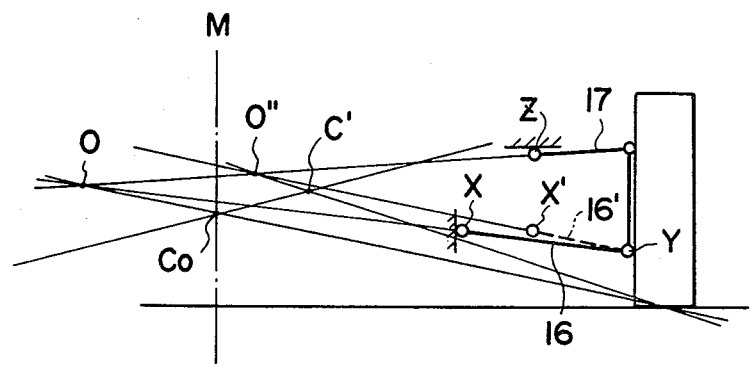
FIG. 9 is a schematic view for illustrating a further embodiment of the present invention applied to a wishbone type suspension.
Figure 10:
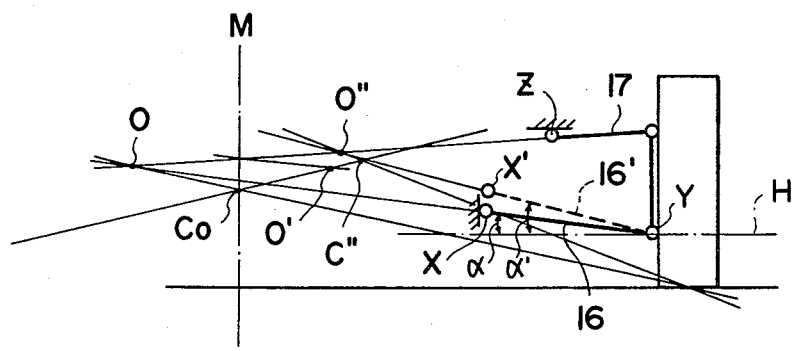
FIG. 10 is a schematic view for illustrating a still further embodiment of the present invention also applied to a wishbone type suspension.
Figure 11:
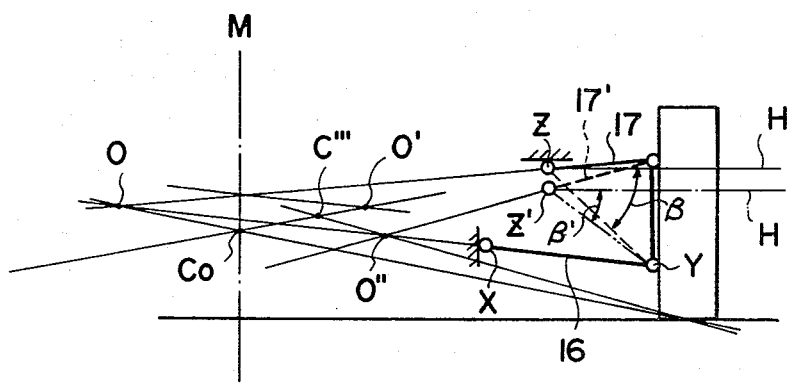
FIG. 11 is a schematic view for illustrating still another embodiment of the present invention also applied to a wishbone type suspension.

FIGS. 9, 10 and 11 illustrate three embodiments of this invention applied to a wishbone type suspension. In these figures, various points corresponding to those shown in FIGS. 6 and 7 are all designated by the same reference characters and the detailed description thereof is omitted. The reference numeral 16 designates a lower arm and 17 designates an upper arm of the wishbone type suspension.

Referring to FIG. 9, the roll center $C_0$ can be shifted toward the side of the center of gravity (the right side in this embodiment) as indicated at C' by making the length of the lower arm 16' on the side of the gravity smaller than the lower arm 16 on the opposite side without changing the height of the point X at which the lower arm 16' is connected to the body.

Further as shown in FIG. 10, the roll center $C_0$ can be shifted toward the side of the center of gravity as indicated at C" by making the inclining angle $\alpha'$ of the lower arm 16' on the side of the center of gravity larger than the inclining angle $\alpha$ of the lower arm 16 on the opposite side.

Further as shown in FIG. 11, the roll center $C_0$ can be shifted toward the side of the center of gravity as indicated at C'" by making the inclining angle $\beta'$ with respect to the horizon H of the line connecting the point Z' at which the upper arm 17' on the side of the center of gravity is connected to the body with the point Y at which the lower arm 16 on the same side is connected to the wheel smaller than that $\beta$ of the corresponding line on the opposite side.

Thus, as shown in FIGS. 9, 10 and 11, in the wishbone type suspension, too, the roll center can be laterally shifted to a desired side by changing the length of one of the lower arms 16, 16' or changing the inclining angles $\alpha$, ($\alpha'$) and $\beta$, ($\beta'$) in one of the front suspension.

Furthermore, as mentioned hereinbefore, the roll center can be laterally shifted to a desired side in other types of suspension such as trailing arm type, semitrailing arm type and so forth. In the trailing arm type, for example, the roll center can be laterally shifted to a desired side by changing the angle of the trailing arm.

I claim:

1. A front suspension for a front engine front wheel drive type vehicle comprising a pair of lower arms swingably connecting right and left front wheels to a lower part of the body of the vehicle, and a pair of upper support means for resiliently connecting the front wheels to an upper part of the body thereby making the front wheels swingable about respective swing centers in which the engine of the vehicle is laterally mounted and the center of gravity of the vehicle thereof is laterally offset from the central longitudinal axis, wherein the improvement comprises locating the roll center at the intersection of a first line passing through the treading point of one of the front wheels and the swing center thereof and a second line passing through the treading point of the other front wheel and the swing center thereof is offset from the longitudinal axis of the body toward the offset center of gravity.

2. A front suspension as defined in claim 1 wherein one of said lower arms on the side of the offset center of gravity is shorter than that of the other lower arm on the opposite side.

3. A front suspension as defined in claim 2 wherein the heights of the connecting points at both ends of one of said lower arms connected to the lower part of the body and to one of the front wheels and the height of the connecting point at which the upper support means of said front wheel is held at the upper part of the body are equal to those of the other front wheel, and the inclining angle with respect to the horizon of the line passing through the upper connecting point of the upper supporting means for said front wheel and the connecting point at an end of the lower arm connected with said front wheel is equal to that of the other front wheel.

4. A front suspension as defined in claim 1 in which the inclining angle with respect to the horizon of one of said lower arms on the side of the offset center of gravity is larger than that of the other lower arm on the opposite side.

5. A front suspension as defined in claim 4 wherein the length of one of the lower arms of one of the front wheels and the height of the connecting point at an end of said lower arm and the height of the connecting point at which the upper support means of said front wheel is held at the upper part of the body are all equal to those of the other front wheel, and the inclining angle with respect to the horizon of the line passing through the upper connecting point of the upper supporting means for said front wheels and the connecting point at an end of the lower arm connected with said front wheel is equal to that of the other front wheel.

6. A front suspension as defined in claim 1 wherein the inclining angle with respect to the horizon of the line passing through the upper connecting point of the upper supporting means for one of the front wheels on the side of the offset center of gravity and the connecting point at an end of the lower arm connected with said front wheel is smaller than that on the opposite side.

7. A front suspension as defined in claim 6 wherein the length of one of said lower arms and the heights of the connecting points at both ends of the lower arm and the inclining angle with respect to the horizon of the lower arm are equal to those of the other lower arm.

8. A front suspension for a front engine front wheel drive type vehicle comprising a pair of laterally arranged suspensions for front wheels in which the engine is laterally mounted and the center of gravity of the vehicle is laterally offset from the central longitudinal axis of the body wherein the improvement comprises locating the roll center at the intersection of a first line passing through the treading point of one of the front wheels and the swing center thereof and a second line passing through the treading point of the other front wheel and the swing center thereof is offset from the longitudinal axis of the body toward the offset center of gravity.

9. A front suspension as defined in claim 8 wherein the length of a lower arm of one of the pair of front suspensions on the side of the offset center of gravity is made shorter than that on the opposite side.

10. A front suspension as defined in claim 8 wherein the including angle with respect to the horizon of a lower arm of one of the pair of front suspensions on the side of the offset center of gravity is made larger than that on the opposite side.

11. A front suspension as defined in claim 8 wherein the angle with respect to the horizon of a line passing through the upper holding point and a connecting end of a lower arm with a front wheel of one of the pair of front suspensions on the side of the offset center of gravity is made smaller than that on the opposite side.

12. A front suspension as defined in one of claims 1 to 11 wherein the suspension is of strut type.

13. A front suspension as defined in one of claims 1 to 11 wherein the suspension is of wishbone type.

* * * * *

UNITED STATES PATENT AND TRADEMARK OFFICE
CERTIFICATE OF CORRECTION

PATENT NO. : 4,469,350

DATED : September 4, 1984

INVENTOR(S) : Hitoshi INOUE

It is certified that error appears in the above-identified patent and that said Letters Patent is hereby corrected as shown below:

In the heading of the patent, [73] Assignee:, delete "Toyo Kogyo Co., Ltd." and insert therefor -- Mazda Motor Corporation --

Signed and Sealed this

Twenty-third Day of April 1985

[SEAL]

Attest:

DONALD J. QUIGG

*Attesting Officer*    Acting Commissioner of Patents and Trademarks